US012173628B2

(12) United States Patent
Berthelemy

(10) Patent No.: US 12,173,628 B2
(45) Date of Patent: Dec. 24, 2024

(54) HEAT ENGINE

(71) Applicant: CIXTEN, Souffelweyersheim (FR)

(72) Inventor: Pierre-Yves Berthelemy, Souffelweyersheim (FR)

(73) Assignee: CIXTEN, Souffelweyersheim (FR)

( * ) Notice: Subject to any disclaimer, the term of this patent is extended or adjusted under 35 U.S.C. 154(b) by 0 days.

(21) Appl. No.: 18/550,218

(22) PCT Filed: Mar. 15, 2022

(86) PCT No.: PCT/EP2022/056726
§ 371 (c)(1),
(2) Date: Sep. 12, 2023

(87) PCT Pub. No.: WO2022/194878
PCT Pub. Date: Sep. 22, 2022

(65) Prior Publication Data

US 2024/0218812 A1 Jul. 4, 2024

(30) Foreign Application Priority Data

Mar. 17, 2021 (FR) ....................................... 2102659

(51) Int. Cl.
*F01K 7/32* (2006.01)
*F01K 25/08* (2006.01)
(Continued)

(52) U.S. Cl.
CPC ................ *F01K 7/32* (2013.01); *F01K 25/08* (2013.01); *F01K 25/103* (2013.01); *F02G 1/044* (2013.01)

(58) Field of Classification Search
CPC .......... F01K 7/32; F01K 25/08; F01K 25/103; F02G 1/044
(Continued)

(56) References Cited

U.S. PATENT DOCUMENTS 3,950,949 A * 4/1976 Martin ...................... F03G 7/04 60/676
4,089,744 A * 5/1978 Cahn ......................... F01K 3/00 60/659
(Continued)

FOREIGN PATENT DOCUMENTS

DE 102009023979 A1 12/2010
DE 102012011514 A1 12/2013
(Continued)

OTHER PUBLICATIONS

International Search Report and Written Opinion for corresponding International Application No. PCT/EP2022/056726, dated Jul. 5, 2022.

*Primary Examiner* — Hoang M Nguyen
(74) *Attorney, Agent, or Firm* — Leason Ellis LLP

(57) ABSTRACT

A heat engine comprises first and second heat sources; a module alternately displacing thermodynamic fluid between a cold portion and a hot portion connected to the first heat source and the second heat source, respectively, said module comprising a chamber containing the thermodynamic fluid and connected to a supply outlet of thermodynamic fluid, said module comprising a displacer moving in said chamber alternately between the cold and hot portions; a first conversion unit converting a pressure difference of the thermodynamic fluid into mechanical energy, the first conversion unit comprising a circuit including a motor and connected to the supply outlet of the thermodynamic fluid; a first control unit placed in the first conversion unit for controlling the phase of the thermodynamic cycle in said module; and a second control unit of said module controlling the displacement of said displacer alternately between the hot and cold portions.

18 Claims, 17 Drawing Sheets

Figure 1:
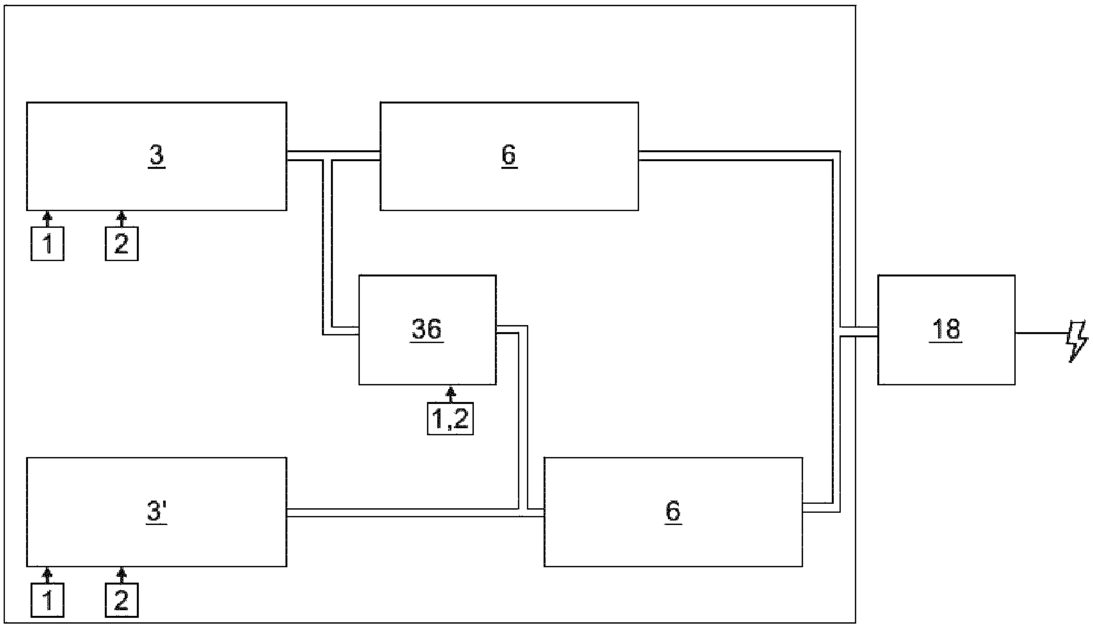

(51) Int. Cl.
*F01K 25/10* (2006.01)
*F02G 1/044* (2006.01)

(58) Field of Classification Search
USPC .......................................................... 60/676
See application file for complete search history.

(56) References Cited

U.S. PATENT DOCUMENTS

| | | | | |
|---|---|---|---|---|
| 10,502,099 | B2 * | 12/2019 | Heinen .................. | F01K 13/02 |
| 10,598,052 | B2 * | 3/2020 | Ebert ........................ | F01K 3/12 |
| 2006/0059912 | A1 | 3/2006 | Romanelli | |
| 2013/0227949 | A1 * | 9/2013 | Robnik ..................... | F02C 6/20<br>60/676 |
| 2015/0152809 | A1 | 6/2015 | Langenfeld | |
| 2017/0130671 | A1 | 5/2017 | Gong | |

FOREIGN PATENT DOCUMENTS

| | | | |
|---|---|---|---|
| FR | 3002286 | A1 | 8/2014 |
| FR | 3078997 | A1 | 9/2019 |

* cited by examiner

HEAT ENGINE

CROSS-REFERENCE TO RELATED PATENT APPLICATIONS

This application is a U.S. National Stage Application under 35 U.S.C. § 371 of International Patent Application No. PCT/EP2022/056726 filed Mar. 15, 2022, which claims the benefit of priority of French Patent Application number 2102659 filed Mar. 17, 2021, both of which are incorporated by reference in their entireties. The International Application was published on Sep. 22, 2022, as International Publication No. WO/2022/194878.

The present invention relates to the field of heat engines.

The control of heat engines such as conventional Stirling engines, where there is mechanical coupling of the moving parts, is complex because the speed of rotation depends mainly on the temperature difference between the hot and cold source. As a result, the actual thermodynamic cycle of this type of heat engine is far removed from the ideal Stirling cycle, consisting of two isochoric and two isothermal transformations. Efficiency is therefore well below theoretical levels.

Improvements have been made to improve the cycle and get as close as possible to the theoretical cycle. For example, publication W02010/043469A1 proposes a method for controlling a fluid piston Stirling cycle heat engine. The process is based on the Stirling cycle, in which the thermodynamic fluid is displaced with working fluid management. The major drawback of this logic is that the working fluid flows between the hot and cold parts, resulting in significant heat losses. In addition, isothermal compression requires regulation by means of a hydraulic compressor.

Publication W084/00399A1 discloses an example of mechanical decoupling between displacer and working piston positions for a Stirling engine supplied with heat by external combustion. However, the system works with a hydraulic piston in addition to the working piston, which makes the engine and its control more complex, especially as a pump is integrated between the pistons to compress the air before mixing it with the fuel.

Another field of low-temperature heat-to-electricity conversion processes are ORC (Organic Rankine Cycle) systems, which take advantage of the phase change of an organic fluid. These systems can theoretically recover energy from very low-temperature sources, but are currently not economically viable for temperatures below 100 degrees Celsius. In addition, they require continuous cycle management based on the temperatures of the cold and hot sources, to ensure that the fluid is indeed single-phase, i.e. either gaseous or liquid, as it passes through the expansion and compression components. A compressor is also essential for compression between the low-pressure and high-pressure parts.

The aim of the present invention is to overcome at least one of these drawbacks and to provide an alternative heat engine solution.

To this end, the invention relates to a heat engine adapted and intended to perform at least one conversion of thermal energy into mechanical energy comprising at least one thermodynamic fluid and adapted and intended to implement a thermodynamic cycle comprising at least one isochoric heating phase, optionally an isobaric heating phase, an expansion phase and an isobaric cooling phase, the heat engine comprising at least:

a first heat source at a first temperature configured to contain and transmit thermal energy to at least one heat transfer fluid, a second heat source at a second temperature configured to contain and transmit thermal energy to at least one heat transfer fluid, the first and second temperatures being different, at least one module for moving the thermodynamic fluid alternately between a cold part connected to the first heat source and a hot part connected to the second heat source, said at least one module comprising at least the cold part, said at least one module comprising a first heat transfer fluid supply circuit connected to the first heat source and to the cold part, said at least one module comprising at least the hot part, said at least one module comprising a second heat transfer fluid supply circuit connected to the second heat source and to the hot part, said at least one module comprising at least one chamber adapted and designed to contain said at least one thermodynamic fluid preferably at high pressure and in the supercritical state and which is connected to at least one thermodynamic fluid supply outlet at a first pressure or to a hydraulic fluid supply outlet at a second pressure, at least one first unit for converting a pressure difference of the thermodynamic fluid into mechanical energy comprising at least one circuit which comprises at least mechanical conversion means, preferably a motor, said first conversion unit being connected to the thermodynamic fluid supply outlet or to the hydraulic fluid supply outlet, said heat engine is characterized in that said at least one module further comprises at least one displacer movable in said chamber alternately between the cold part and the hot part, said chamber being suitable and designed to contain said at least one high-pressure thermodynamic fluid having pressures between 50 bar and 300 bar and in the supercritical state, in that it comprises at least a first control unit disposed at least partly in the first conversion unit arranged at least to control the phase in which the thermodynamic cycle is in said at least one module, and in that it comprises a second control unit of said at least one module arranged to control the displacement of said at least one displacer alternately between the hot part and the cold part.

Figure 2:
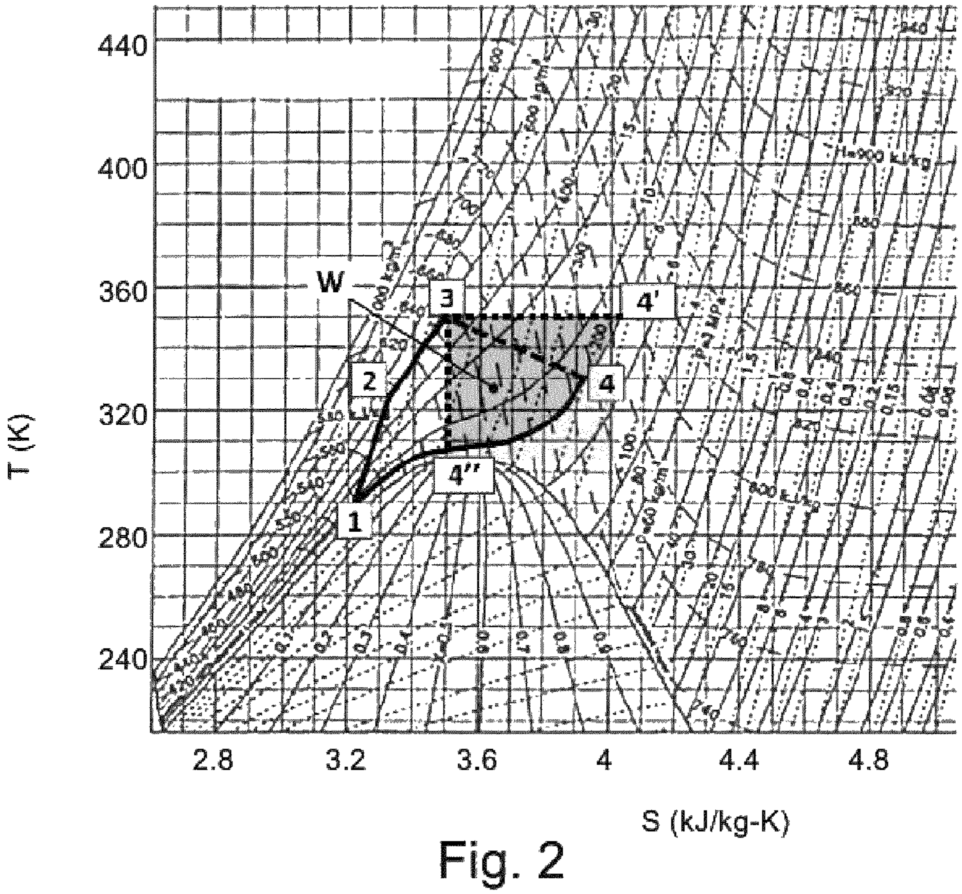
Figure 3:
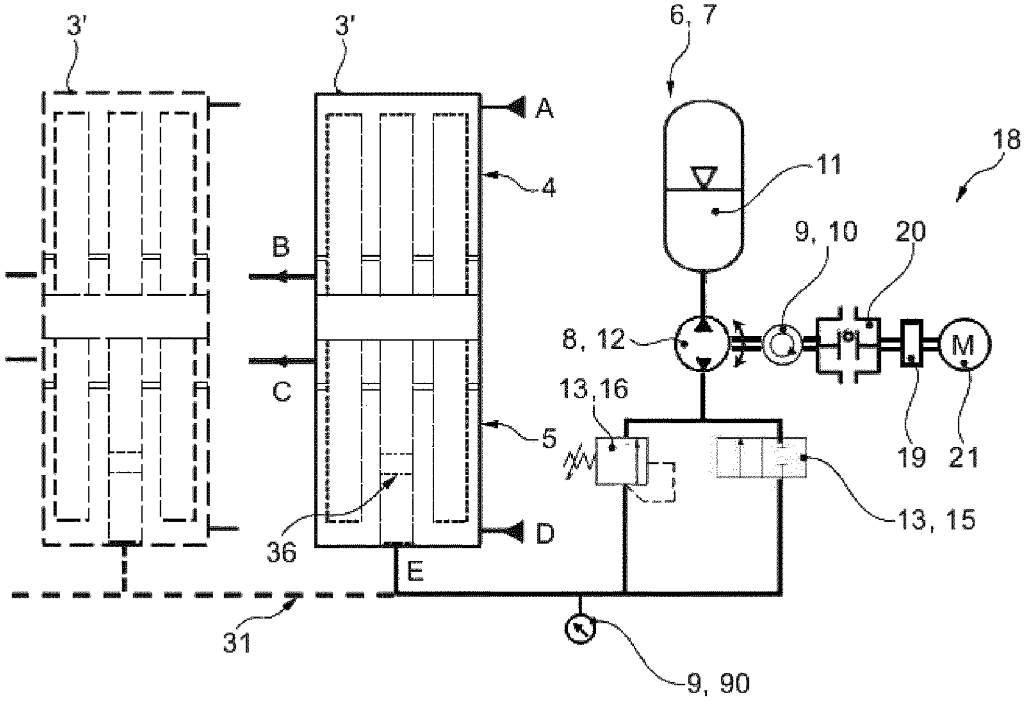
Figure 4:
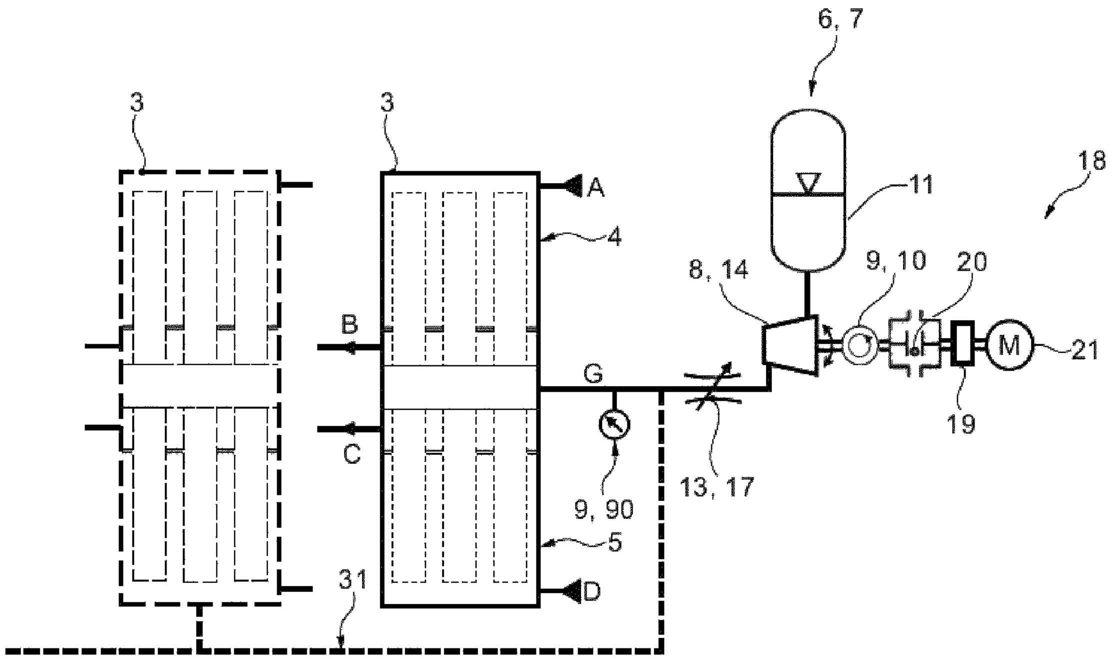
Figure 5:
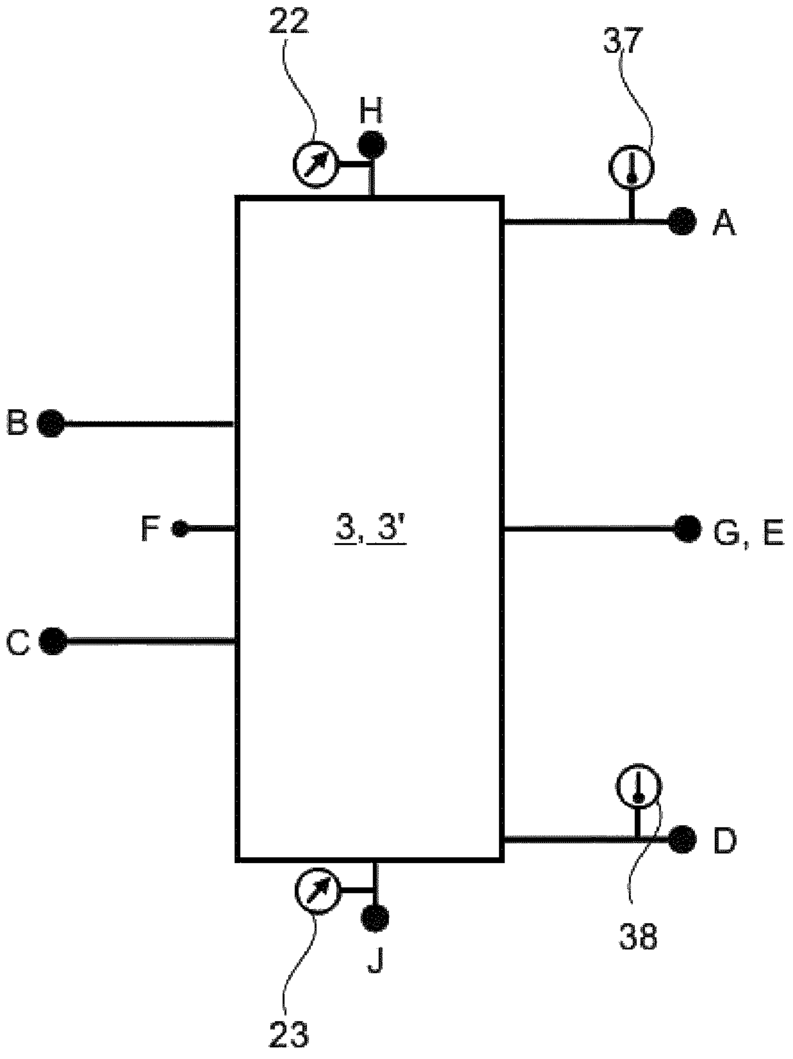
Figure 6:
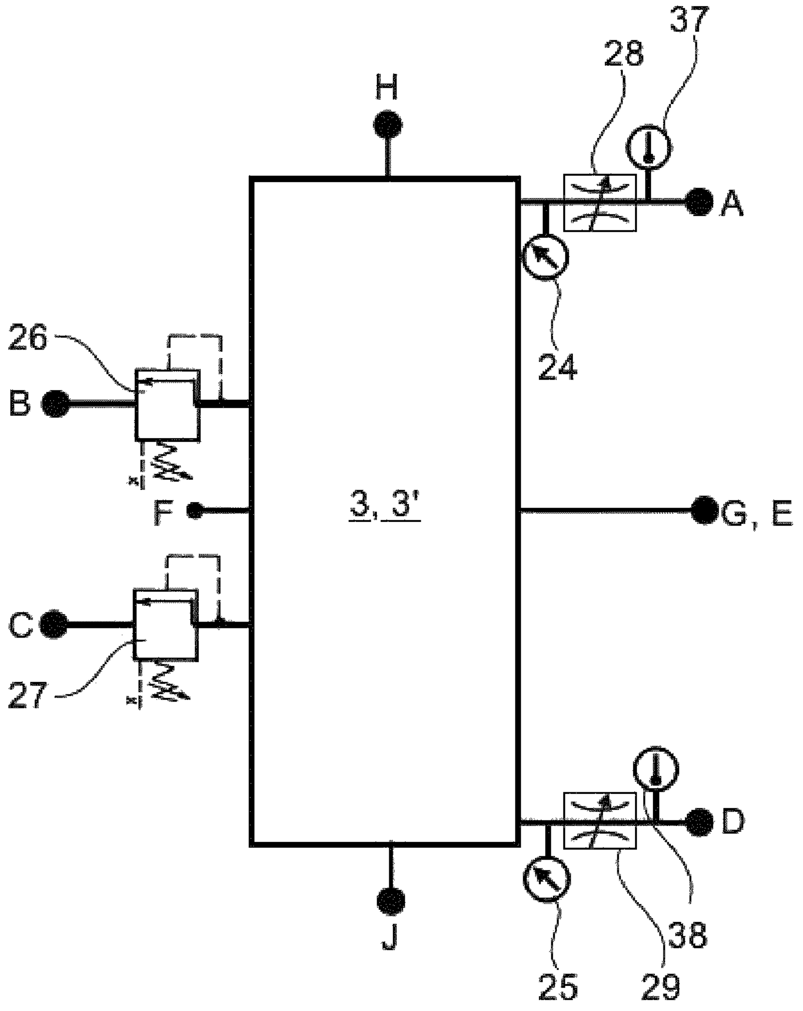
Figure 7:
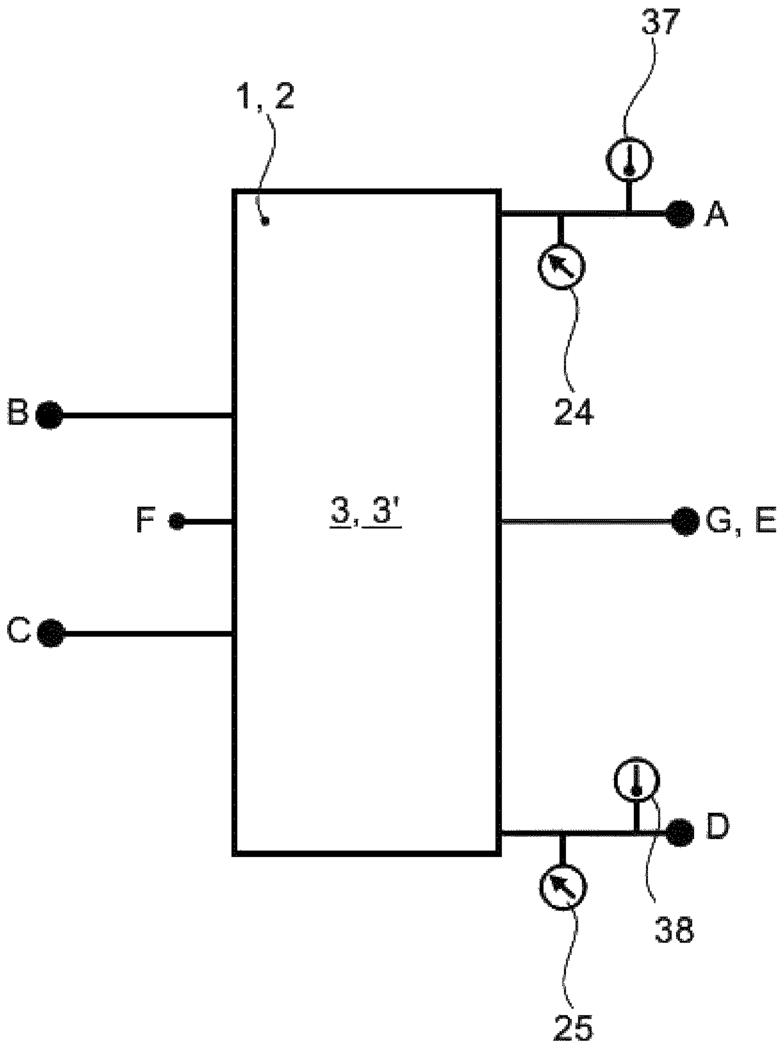
Figure 8:
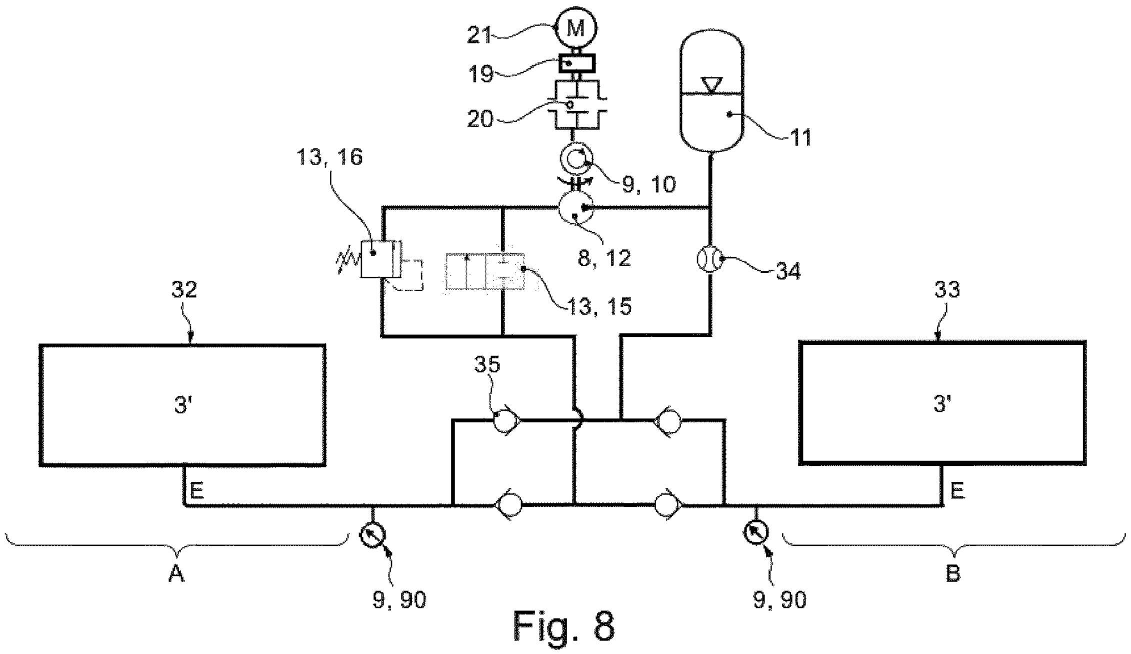
Figure 9:
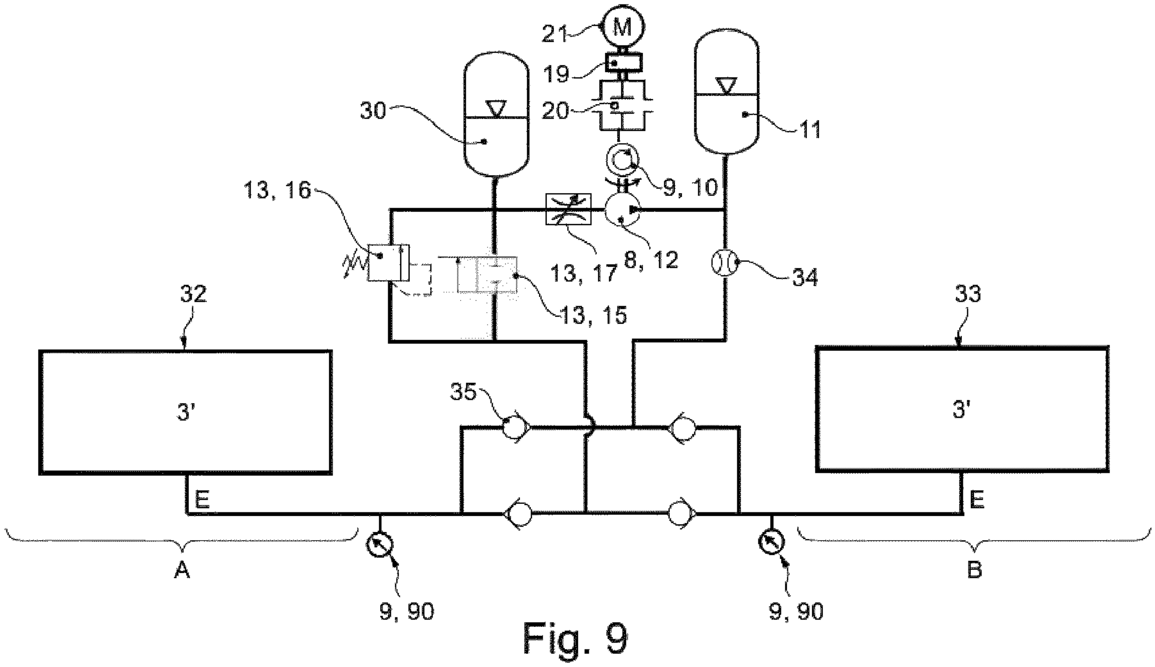
Figure 10:
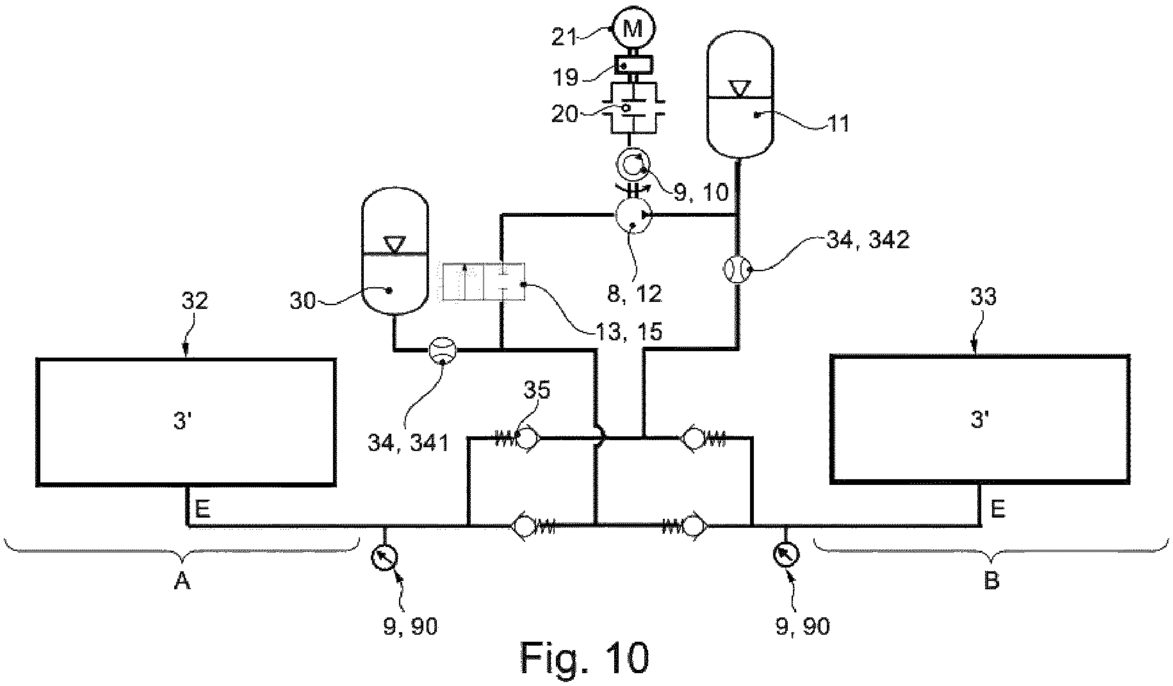
Figure 11:
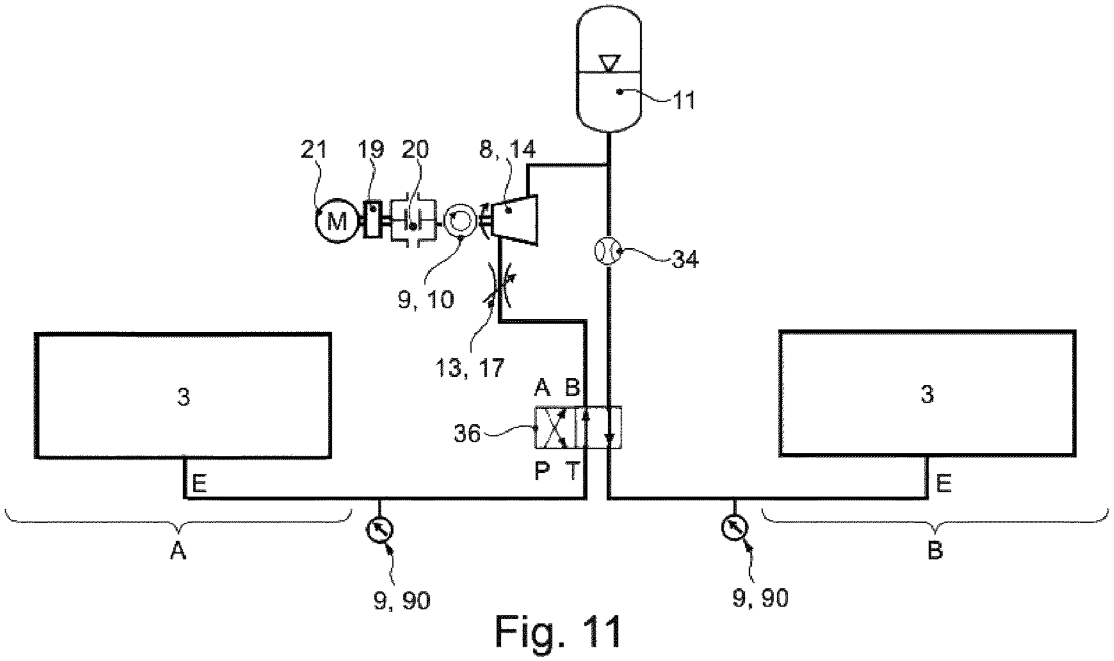
Figure 12:
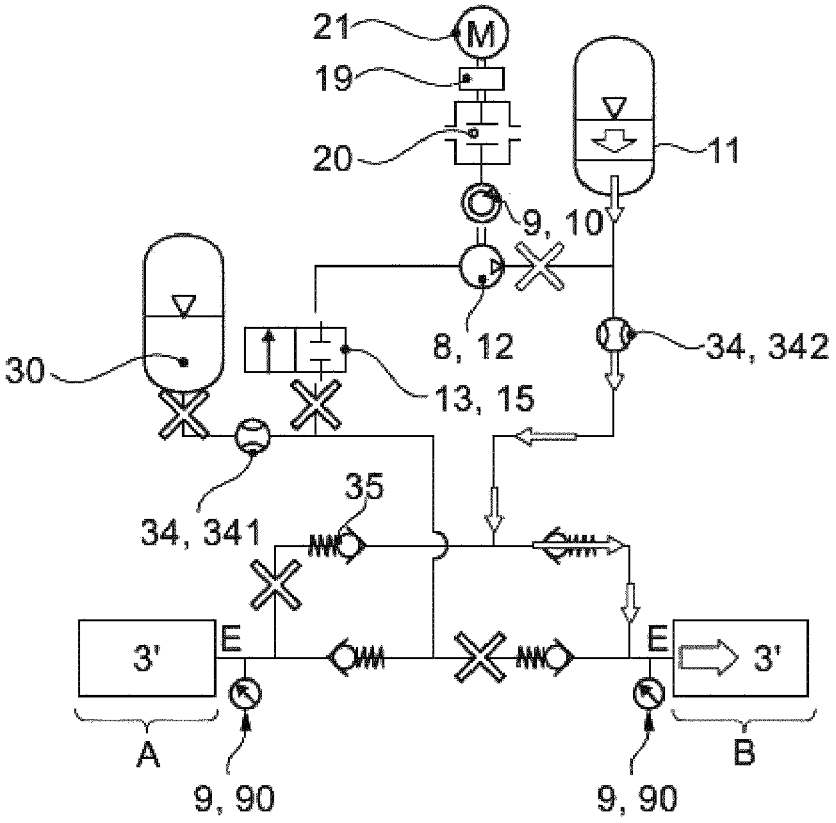
Figure 13:
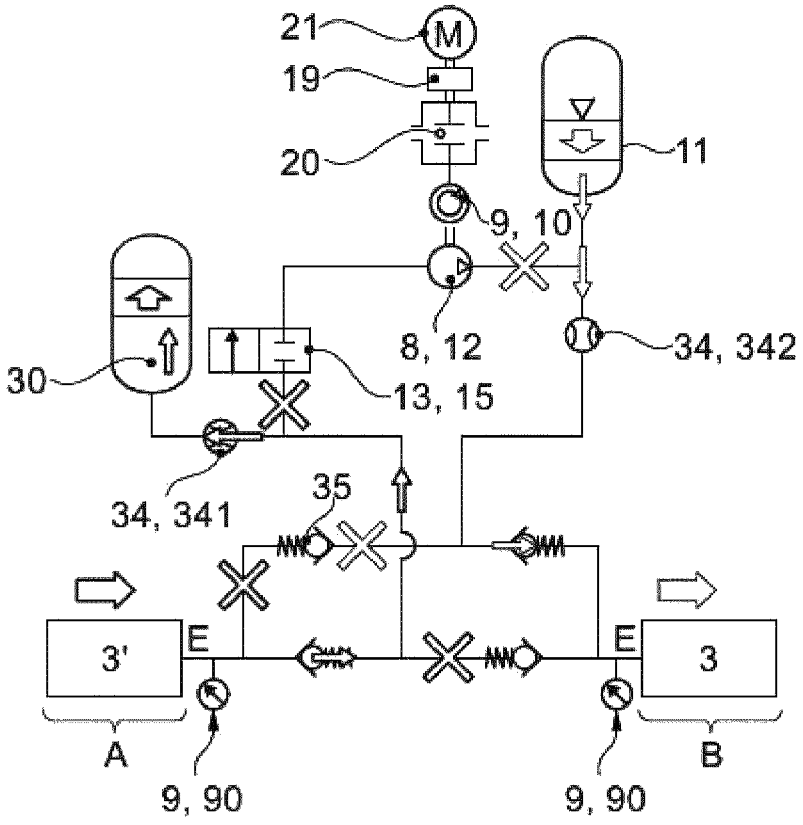
Figure 14:
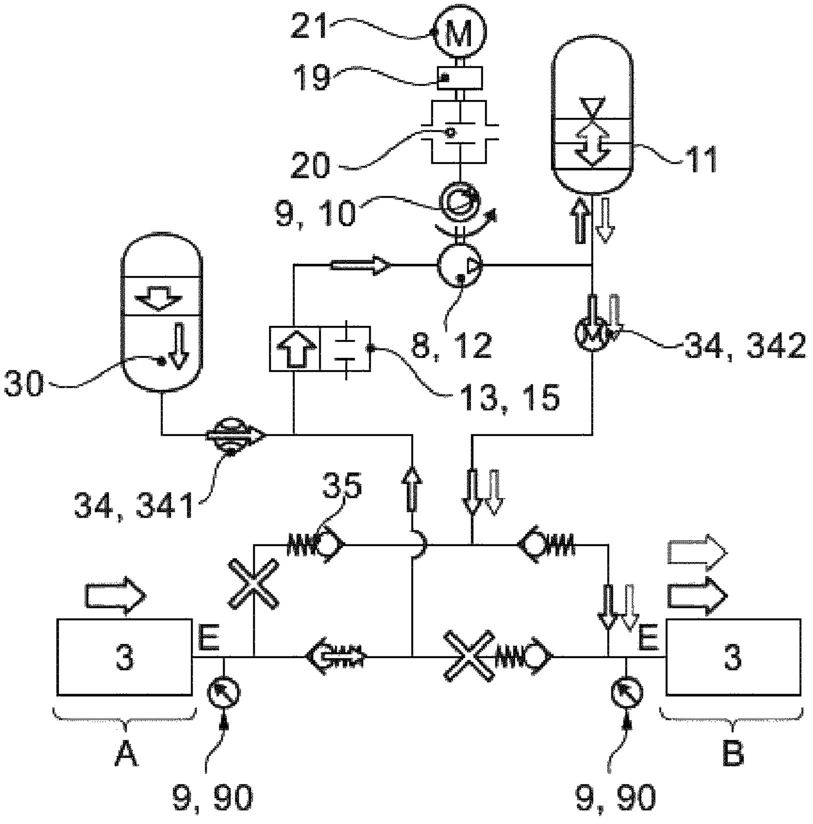
Figure 15:
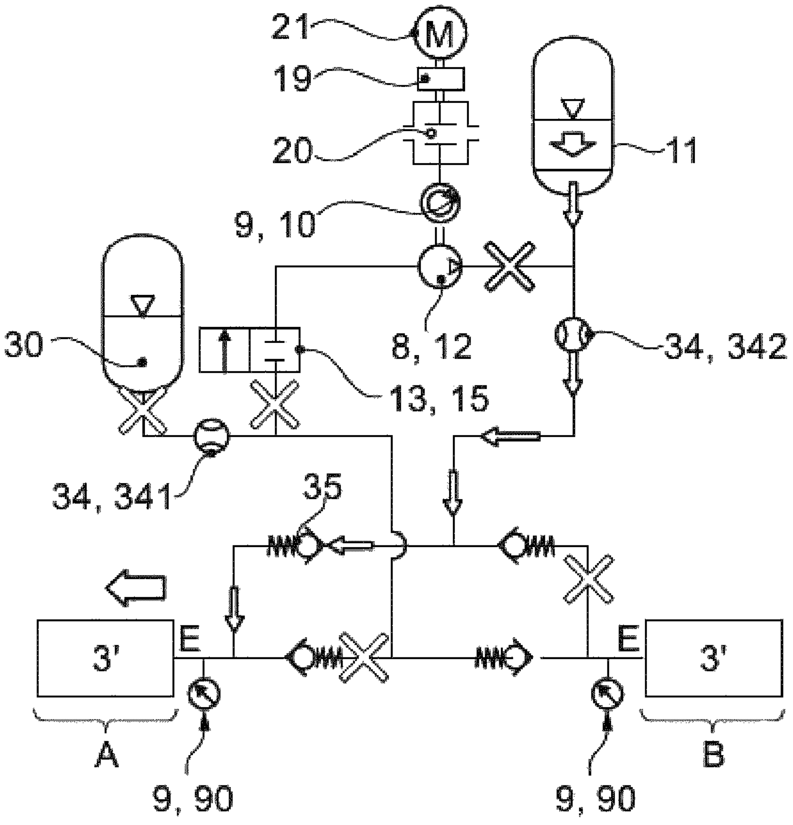
Figure 16:
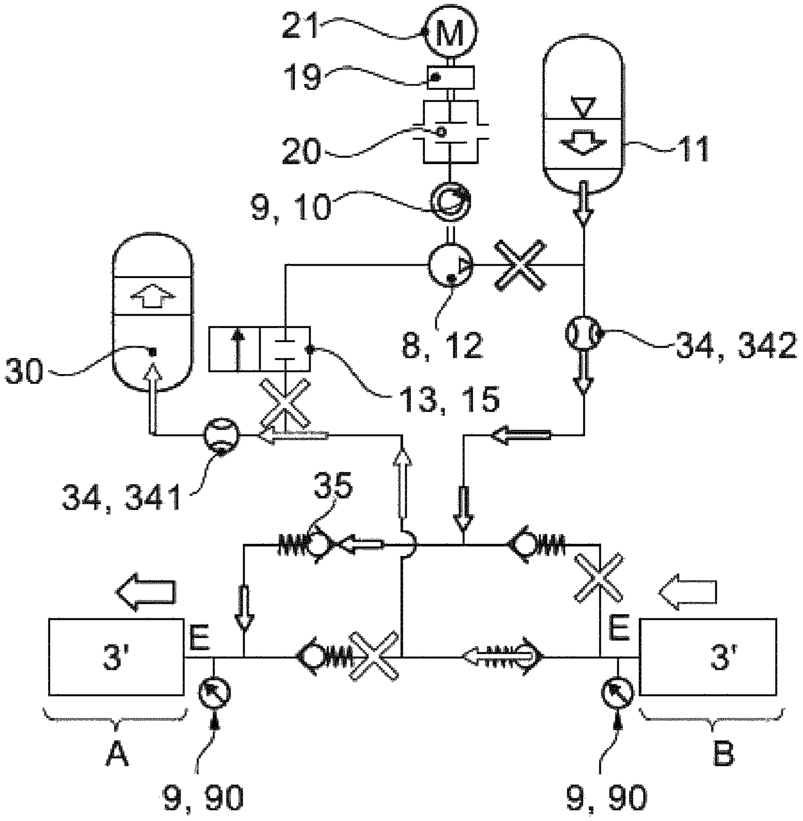
Figure 17:
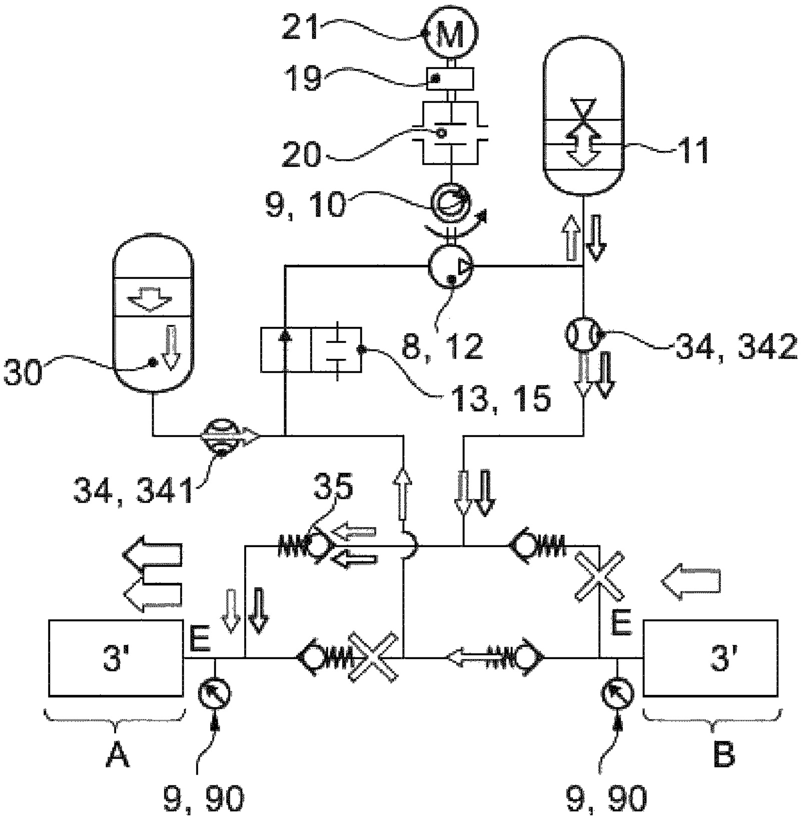
Figure 18:
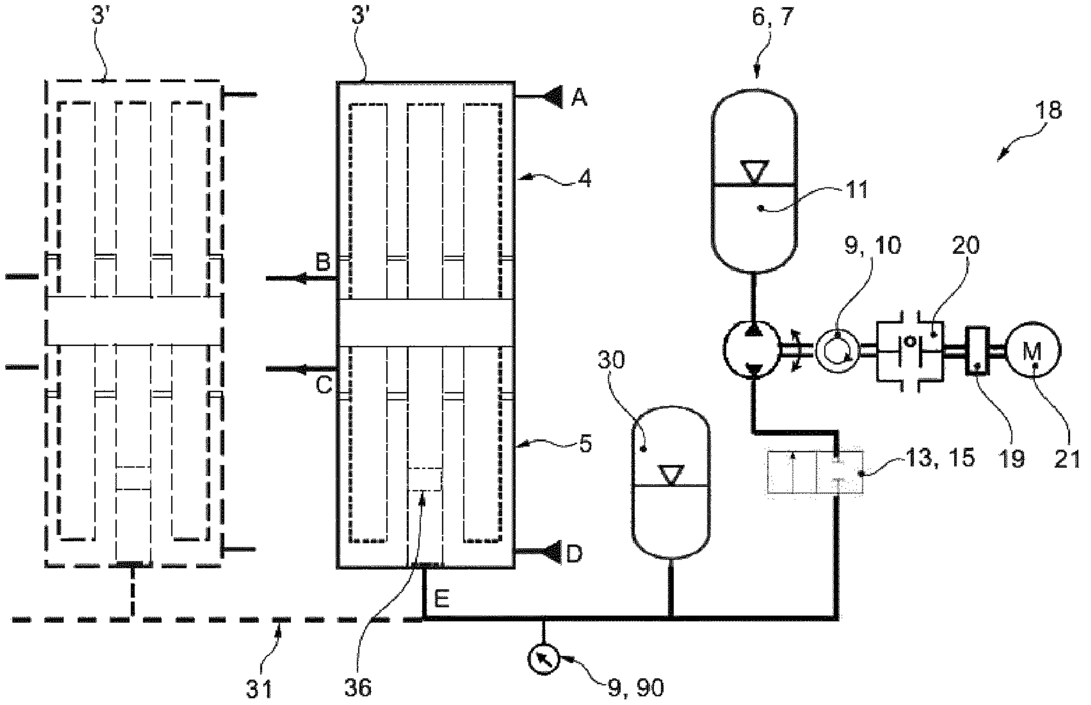
Figure 19:
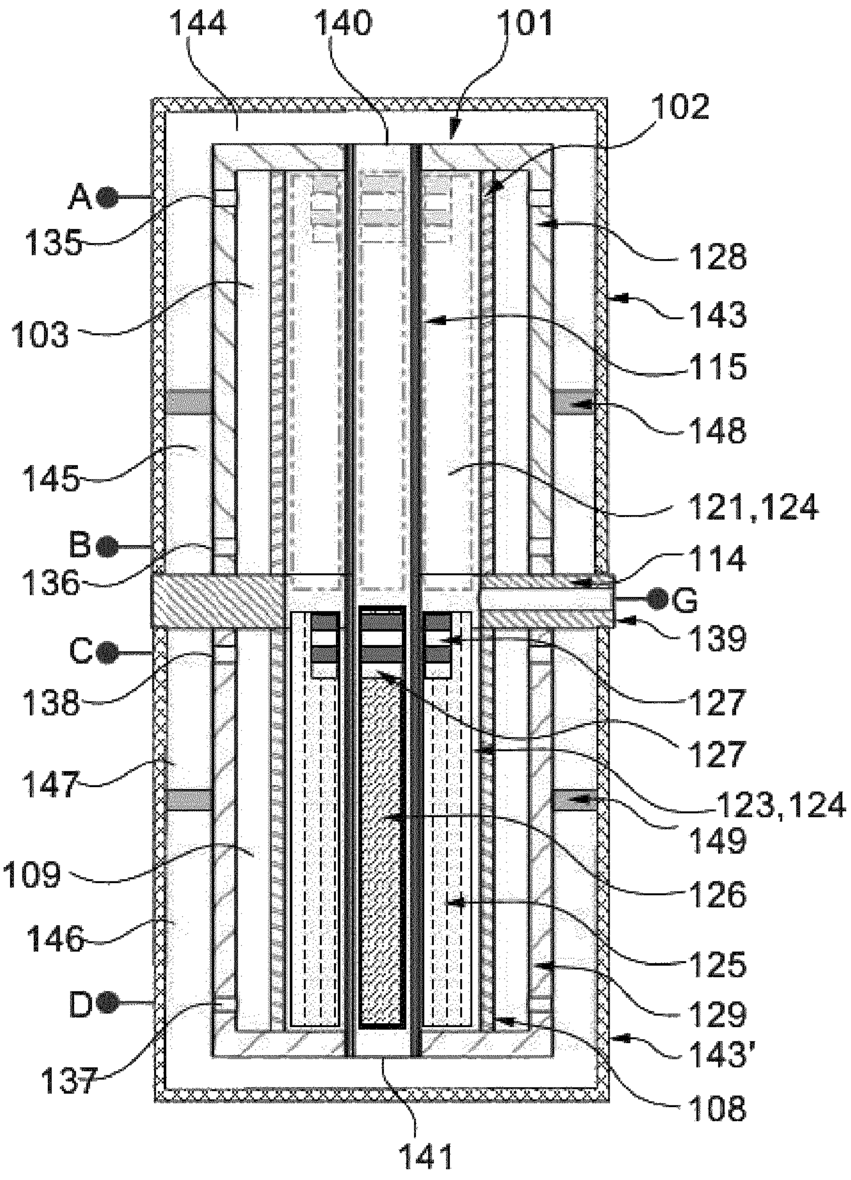

The invention will be better understood from the following description, which refers to several preferred embodiments, given as non-limiting examples, and explained with reference to the appended schematic drawings, in which:

FIG. 1 shows a schematic diagram of the heat engine as a function of module type, FIG. 2 shows the temperature T-entropy S diagram of a thermodynamic cycle of the carbon dioxide heat engine, FIG. 3 shows a schematic view of a heat engine according to a first variant of the invention, illustrating the first control unit, FIG. 4 shows a schematic view of a heat engine according to a second variant of the invention, illustrating the first control unit, FIG. 5 shows a schematic view of a heat engine module illustrating a second control unit according to a first possibility, FIG. 6 shows a schematic view of a heat engine module illustrating the second control unit according to a second possibility, FIG. 7 shows a schematic view of a heat engine module illustrating the second control unit, FIG. 8 shows a schematic view of a heat engine with an anti-phase architecture according to a first example, FIG. 9 shows a schematic view of a heat engine with an anti-phase architecture according to a second example, FIG. 10 shows a schematic view of a heat engine with an anti-phase architecture according to a third example, FIG. 11 shows a schematic view of a heat engine with an anti-phase architecture according to a fourth example, FIG. 12 shows a schematic view of a heat engine with an anti-phase architecture according to the third example and illustrates its operation, FIG. 13 shows a schematic view of a heat engine with an anti-phase architecture according to the third example and illustrates its operation, FIG. 14 shows a schematic view of a heat engine with an anti-phase architecture according to the third example and illustrates its operation, FIG. 15 shows a schematic view of a heat engine with an anti-phase architecture according to the third example and illustrates its operation, FIG. 16 shows a schematic view of a heat engine with an anti-phase architecture according to the third example and illustrates its operation, FIG. 17 shows a schematic view of a heat engine with an anti-phase architecture according to the third example and illustrates its operation, FIG. 18 shows a schematic view of a heat engine according to the first variant of the invention, in which the pressure limiter is replaced by an additional pressure accumulator, FIG. 19 shows a cross-sectional view of a module comprising a cartridge.

A heat engine is adapted and designed to perform at least one conversion of thermal energy into mechanical energy comprising at least one thermodynamic fluid and adapted and designed to implement a thermodynamic cycle comprising at least one isochoric heating phase 1-2, optionally an isobaric heating phase 2-3, an expansion phase 3-4 and an isobaric cooling phase 4-1 (FIG. 2).

The heat engine comprises at least:

a first heat source 1 at a first temperature T1 configured to contain and transmit thermal energy to at least one heat transfer fluid (FIG. 1), a second heat source 2 at a second temperature T2 configured to contain and transmit thermal energy to at least one heat transfer fluid, the first and second temperatures T1 and T2 being different (FIG. 1), at least one module 3, 3' for moving the thermodynamic fluid alternately between a cold part 4 connected to the first heat source 1 and a hot part 5 connected to the second heat source 2 (FIGS. 3 to 16), said at least one module 3, 3' comprising at least the cold part 4, said at least one module 3, 3' comprising a first heat transfer fluid supply circuit A, B connected to the first heat source 1 and to the cold part 4, said at least one module 3, 3' comprising at least the hot part 5, said at least one module 3, 3' comprising a second heat transfer fluid supply circuit C, D connected to the second heat source 2 and to the hot part 5, said at least one module 3, 3' comprising at least one chamber suitable and designed to contain said at least one thermodynamic fluid and which is connected to at least one thermodynamic fluid supply outlet G at a first pressure P1 or to a hydraulic fluid supply outlet E at a second pressure P2, at least one first conversion unit 6 for converting a pressure difference of the thermodynamic fluid into mechanical energy comprising at least one circuit 7 which comprises at least mechanical conversion means, preferably a motor 8, said first conversion unit 6 being connected to the thermodynamic fluid supply outlet G (FIGS. 4 and 11) or to the hydraulic fluid supply outlet E (FIGS. 3, 8 to 10).

In accordance with the invention, the heat engine is characterized in that said at least one module 3, 3' further comprises at least one displacer movable in said chamber alternately between the cold part 4 and the hot part 5, said chamber being suitable and designed to contain said at least one high-pressure thermodynamic fluid having pressures between 50 bar and 300 bar and in the supercritical state, in that it comprises at least one first control unit at least partly located in the first conversion unit 6 arranged at least to control the phase in which the thermodynamic cycle is, in said at least one module 3, 3', and in that it comprises a second control unit of said at least one module 3, 3' arranged to control the displacement of said at least one displacer alternately between the hot part 5 and the cold part 4.

Advantageously, the heat engine according to the invention enables the conversion of heat, preferably at low temperature, i.e. for first and second heat sources 1, 2 whose temperature T1, T2 does not exceed 150 degrees Celsius, into mechanical energy. This conversion takes place in a closed thermodynamic cycle using a thermodynamic fluid, preferably in the supercritical phase, alternately heated and cooled via the first heat source 1 and the second heat source 2. As illustrated in FIG. 2, the thermodynamic cycle comprises at least one isochoric heating phase 1-2, optionally an isobaric heating phase 2-3, a preferably polytropic expansion phase 3-4 and an isobaric cooling phase 4-1. The supercritical thermodynamic cycle includes isochoric heating 1-2, which is completed by isobaric heating 2-3 if the pressure during heating exceeds a set limit value between 100 bar and 200 bar. When the thermodynamic fluid is carbon dioxide, the pressure ranges of the thermodynamic fluid are typically between 74 bar and 350 bar, preferably 74 bar and 250 bar, and the temperature ranges are between 0 degrees Celsius and 150 degrees Celsius, preferably between 10 degrees Celsius and 100 degrees Celsius. These different phases of the thermodynamic cycle can be controlled to modulate the actual thermodynamic cycle followed by the thermodynamic fluid. This makes it possible to continuously influence efficiency and average power. Advantageously, the first conversion unit 6 converts the pressure of the thermodynamic fluid at the thermodynamic fluid supply outlet G or of the hydraulic fluid at the hydraulic fluid supply outlet E into mechanical motion. Energy recovery by the first conversion unit 6 can thus take place using a hydraulic fluid different from the thermodynamic fluid (FIGS. 3, 8 to 10) or directly with the thermodynamic fluid (FIGS. 4 and 11). The first control unit monitors the state of completion of each thermodynamic transformation phase and therefore of the thermodynamic cycle, in particular by detecting the points of the thermodynamic cycle, for example by detecting pressure and/or flow rate, as described below. The second control unit alternately moves the thermodynamic fluid in the chamber from the cold part 4 to the hot part 5 and modulates the heat input to the module 3, 3'. For example, the second control unit can control the pressure and/or flow rate from the first and second heat sources 1, 2, as described below. As a result, the efficiency of the heat engine and its average power density can be modulated at will, offering the possibility of optimizing one or the other depending on the availability of the first and second heat sources 1, 2.

The displacer is one or more mechanical parts.

Preferably, expansion 3, 4 is polytropic, i.e. it is neither isothermal nor adiabatic. Thus, the expansion is variable and can approach either an isothermal expansion 3, 4' or an adiabatic expansion 3, 4" (FIG. 2).

Preferably, the isochore 1-2 heating phase does not correspond to ideal/theoretical isochore heating, but the heating phase approaches this ideal or theoretical isochore with a deviation value which is preferably between 0 and 20 percent.

Preferably, the 2-3 isobaric heating phase and/or the 4-1 cooling phase do not correspond to ideal/theoretical isobars but approach them with a deviation value that is preferably between 0 and 20 percent.

In the case where module 3 comprises at least one chamber suitable and intended to contain only a thermodynamic fluid preferably at high pressure, i.e. for pressures preferably between 50 bar and 300 bar, preferably between 80 bar and 250 bar, and in the supercritical state, and which is connected to the thermodynamic fluid supply outlet G, this module 3 is said to be basic. This is particularly the case for the modules 3 described in FIGS. 4 and 11.

If the module 3' also includes a hydraulic piston 36 connected to the hydraulic fluid supply outlet E, the module 3' is referred to as a hybrid. This is particularly the case for the 3' modules described in FIGS. 3, 8 to 10.

Alternatively, the so-called basic module 3 can be connected to a hydraulic piston 36 outside the module 3. Each basic module 3 or combination of basic modules 3 can be coupled to one or more high-pressure hydraulic piston(s) 36 outside the module(s) 3 and maintained at temperature by one of the first/second heat sources 1, 2. The hydraulic piston 36 thus enables the pressure of the supercritical fluid to be transmitted to a hydraulic fluid. A hydraulic reduction ratio, not shown, can also be realized within the hydraulic piston 36 so as to modify the characteristics of the pressure and volume of oil displaced. This may have some advantage in some cases to facilitate load system sizing, particularly to match the pressure/flow characteristics of the hydraulic motor 12. If no reduction ratio is required, then the hydraulic piston 36 can be in the form of a so-called “liquid piston”, i.e. with no solid interface between the two fluids, provided they are immiscible and mutually insoluble. This avoids losses due to seal friction.

As illustrated in FIG. 3, according to a first embodiment of the invention, said first conversion unit 6 comprises at least one hydraulic pressure accumulator 11 connected downstream of the mechanical conversion means, preferably of motor 8, which is a hydraulic motor 12, said pressure accumulator 11 being suitable and designed to maintain the pressure of circuit 7 greater than or equal to the critical pressure of the thermodynamic fluid.

Advantageously, the pressure accumulator 11 ensures that the pressure of the hydraulic fluid in circuit 7 is maintained above or equal to the critical pressure of the thermodynamic fluid for the entire thermodynamic cycle, and in particular during the isobaric cooling phase. For carbon dioxide, this critical pressure is approximately equal to 73.77 bar. Consequently, the pre-charged pressure of pressure accumulator 11 is preferably between 73 and 85 bar, preferably 80 bar. In this configuration, the thermodynamic fluid contained in one or more so-called hybrid module(s) 3' is alternately heated and then cooled, working against a quasi-constant assimilated pressure of pressure accumulator 11. The pressure differences of the thermodynamic fluid, an then of the hydraulic fluid, are converted into mechanical energy by the hydraulic motor 12.

As shown in FIG. 4, according to a second embodiment of the invention, said first conversion unit 6 comprises at least one pressure accumulator 11 connected downstream of the mechanical conversion means, preferably the motor 8 which is a turbine with thermodynamic fluid 14 preferably in the supercritical state, said pressure accumulator 11 being suitable and designed to maintain the pressure of circuit 7 greater than or equal to the critical pressure of the thermodynamic fluid.

Advantageously, the pressure accumulator 11 ensures that the pressure of the thermodynamic fluid in circuit 7 is maintained above or equal to the critical pressure of the thermodynamic fluid for the entire thermodynamic cycle, and in particular during the isobaric cooling phase. For carbon dioxide, this critical pressure is approximately equal to 73.77 bar. Consequently, the pre-charged pressure of pressure accumulator 11 is preferably between 73 and 85 bar, preferably 80 bar. In this configuration, the thermodynamic fluid contained in one or more so-called basic module(s) 3 is alternately heated and then cooled, working against a quasi-constant assimilated pressure of pressure accumulator 11. Only the pressure differences in the thermodynamic fluid are converted into mechanical energy by the thermodynamic fluid turbine 14.

Preferably, said first control unit comprises at least one pressure and/or flow rate measuring member 9 arranged to monitor the phase in which the thermodynamic cycle is, and in particular to determine the completion of each phase of the cycle. Said pressure and/or flow rate measuring device 9 is preferably arranged between the chamber and said pressure accumulator 11.

Advantageously, the said first control unit enables the various phases of the thermodynamic cycle to be monitored by means of at least one pressure and/or flow rate measuring device 9 located in circuit 7 or in the chamber, by measuring the pressure of the thermodynamic or hydraulic fluid in the chamber or in circuit 7 and/or by measuring the flow rate of the hydraulic fluid in circuit 7. This pressure and/or flow rate measuring device 9 is located upstream of motor 8 or at the level of motor 8. This configuration makes it possible to monitor the state of completion of each thermodynamic transformation and therefore of the thermodynamic cycle, in particular by detecting the points in the cycle by detecting and monitoring the pressure and/or flow rate of the thermodynamic fluid or hydraulic fluid.

Preferably as shown in FIGS. 3 and 4, according to the first embodiment of the invention and the second embodiment, said first control unit comprises two pressure and/or flow measuring elements 9 of circuit 7 in the form of a pressure sensor 90 and a rotational speed sensor 10.

The rotational speed sensor 10 is located at the motor 8 and enables indirect measurement of the flow rate in circuit 7. For example, the rotational speed sensor 10 can be used to conclude, by measuring the flow rate of hydraulic fluid in circuit 7, that the system is in equilibrium at the end of the isobaric heating phase.

Pressure sensor 90 enables direct measurement of the hydraulic fluid pressure in circuit 7 (FIG. 3) or direct measurement of the thermodynamic fluid pressure in circuit 7 (FIG. 4).

According to the first embodiment shown in FIG. 3, said pressure and/or flow meter 9 is arranged between the hydraulic fluid supply outlet E and said pressure accumulator 11. Said pressure and/or flow meter 9 is arranged in circuit 7.

According to the second embodiment shown in FIG. 4, said pressure and/or flow meter 9 is arranged between the thermodynamic fluid supply outlet G and said pressure accumulator 11. Said pressure and/or flow meter 9 is arranged in circuit 7.

Preferably and as illustrated in FIGS. 3 and 4, said first control unit comprises at least one pressure and/or flow regulation element 13 of circuit 7 arranged at least to control/pilot the isobaric heating phase and/or the expansion phase of the thermodynamic cycle, said at least one pressure and/or flow regulation element 13 being disposed between the thermodynamic fluid supply outlet G or the hydraulic fluid supply outlet E and said pressure accumulator 11.

Advantageously, the said first control unit enables, in particular by means of at least one pressure and/or flow regulation element 13, the motor 8 to be supplied or not. The said first control unit also makes it possible, thanks to at least one pressure and/or flow regulation element 13, to control the movement of the thermodynamic fluid (FIG. 4) or of the hydraulic fluid (FIG. 3) in circuit 7 in order to control/pilot the isobaric heating phase and/or the expansion phase of the thermodynamic cycle.

Preferably, said at least one pressure and/or flow regulating element 13 is selected from a pressure limiter 16 (FIG. 3) and/or a flow regulator, and/or a hydraulic valve 15 (FIG. 3) and/or an adjustable flow limiter and/or a variable throttle orifice 17 (FIG. 4) or an additional pressure accumulator 30 (FIG. 18).

According to the first embodiment shown in FIG. 3, said at least one pressure and/or flow regulating element 13 is arranged between the hydraulic fluid supply outlet E and said pressure accumulator 11.

According to the first embodiment shown in FIG. 3, said first control unit comprises two pressure and/or flow regulating elements 13 in the form of an adjustable pressure limiter 16 and a hydraulic valve 15.

Advantageously, the adjustable pressure limiter 16 ensures the transition from the isochoric heating phase to the isobaric heating phase at a given pressure. At the end of isobaric heating, when the system is at equilibrium, hydraulic valve 15 is opened to carry out polytropic expansion, followed by fluid cooling after inversion of the displacers in module(s) 3'.

As shown in FIG. 18, the adjustable pressure relief valve 16 can be replaced by an additional pressure accumulator 30, preferably pre-charged to isobaric heating pressure.

This configuration allows energy to be stored in the additional pressure accumulator 30 during the isochore heating phase.

According to the second embodiment shown in FIG. 4, said at least one pressure and/or flow regulating element 13 is arranged between the thermodynamic fluid supply outlet G and said pressure accumulator 11.

According to the second embodiment shown in FIG. 4, said first control unit comprises a pressure and/or flow regulating element 13 in the form of a variable throttle orifice 17.

Advantageously, in this second variant the adjustable pressure relief valve 16 and the hydraulic valve 15 of the first variant can be replaced by a single variable throttle orifice 17 so as to be able to actively control the isobaric heating phase and the preferably polytropic expansion phase.

In the first conversion unit, circuit 7 may comprise one or more preferably thermally insulated lines which, in particular, connect the thermodynamic fluid supply outlet G or the hydraulic fluid supply outlet E to the pressure accumulator 11 and/or the pressure and/or flow rate measuring device 9 and/or the pressure and/or flow rate regulating element 13 and/or the motor 8.

Preferably and as illustrated in FIGS. 3 and 4, the machine further comprises a second mechanical-to-electrical energy conversion unit 18 connected to said first conversion unit 6 downstream of said motor 8.

Advantageously, the second conversion unit 18 converts mechanical energy from motor 8 into electrical energy.

Preferably and as illustrated in FIGS. 3 and 4, the second conversion unit 18 comprises at least one inertia 19 connected on the one hand to a coupling 20 and on the other hand to a generator 21.

Preferably, module 3, 3' comprises at least one piston (not shown) contained in a cylinder (not shown) connected to a working fluid supply circuit J, H through a first end and a second end of the cylinder to drive the displacement of the movable piston in the cylinder, and the displacer and piston are coupled to each other.

Advantageously, displacement of the piston causes displacement of the displacer in the chamber between the hot part 5 and the cold part 4. The coupling between displacer and piston is preferably a magnetic coupling to limit friction losses in particular.

Preferably and as illustrated in FIG. 5, according to a first possibility the second control unit comprises at least one first pressure and/or flow regulating member at the first end of the cylinder and at least one second pressure and/or flow regulating member at the second end of the cylinder to maintain or vary a pressure difference between the first end and the second end so as to alternately displace said at least one displacer between the hot part 5 and the cold part 4.

Advantageously, the second control unit controls the position of the thermodynamic fluid between the hot part 5 and the cold part 4 in at least one module 3, 3'. Each module 3, 3' contains a certain mass of thermodynamic fluid, preferably in the supercritical phase, which is alternately brought into contact with the first heat source 1 and then the second heat source 2 via one or more displacer(s). The displacer(s) function(s) as free pistons whose stop-type position is determined solely by the pressure difference between the first cylinder end and the second cylinder end. In this case, the working fluid supply circuit J, H is independent of the pressure regulation of said first heat transfer fluid supply circuit A, B and said second heat transfer fluid supply circuit C, D.

Preferably, as shown in FIGS. 6 and 7, the working fluid supply circuit J, H is formed by said first heat transfer fluid supply circuit A, B and said second heat transfer fluid supply circuit C, D.

Preferably, and according to a possibility not shown, the second control unit comprises at least a first pressure and/or flow rate regulating member for the first heat source 1 and a second pressure and/or flow rate regulating member for the second heat source 2, the first pressure and/or flow rate regulating member and the second pressure and/or flow rate regulating member being configured to maintain or vary a pressure difference between the first heat source 1 and the second heat source 2, the first pressure and/or flow rate regulating member and the second pressure and/or flow rate regulating member being configured to maintain or vary a pressure difference between the first heat source 1 and the second heat source 2 so as to alternately displace said at least one displacer between the cold part 4 and the hot part 5.

Preferably, the first heat source 1 comprises at least one preferably hydraulic pump, which forms the first pressure and/or flow regulator, and the second heat source 2 comprises a second preferably hydraulic pump, which forms the second pressure and/or flow regulator.

Control of the displacement of the preferably supercritical hydraulic fluid in module 3, 3' is thus achieved as simply as possible by suitable regulation of the preferably hydraulic pumps (not shown) of the first and second heat sources 1, 2 in order to create/maintain the differential pressure between the first and second heat transfer fluid supply circuits A, B and C, D required for displacement of the displacer(s).

If control of the preferably hydraulic pumps is not an option, then control of the first/second heat transfer fluid supply circuits A, B and C, D with the add-on elements described below in the second possibility (pressure relief valve 26, 27 and/or flow regulator 28, 29) enables precise control of the flow and pressure in each part of the module(s) 3, 3'.

Preferably, as shown in FIG. 6, according to a second possibility, the second control unit comprises at least a third member for regulating the pressure and/or flow rate of the first supply circuit A, B and a fourth member for regulating the pressure and/or flow rate of the second supply circuit C, D, the third pressure and/or flow rate regulating member and the fourth pressure and/or flow rate regulating member being configured to maintain or vary a pressure difference between the first supply circuit A, B and the second supply circuit C, D so as to alternately displace said at least one displacer between the cold part 4 and the hot part 5.

Advantageously, the second control unit controls the position of the thermodynamic fluid between the hot part 5 and the cold part 4 in at least one module 3, 3'. Each module 3, 3' contains a certain mass of thermodynamic fluid, preferably in the supercritical phase, which is alternately brought into contact with the first heat source 1 and then the second heat source 2 via one or more displacer(s). These displacer(s) function(s) as free pistons whose stop-type position is determined solely by the pressure difference between the first and second heat transfer fluid supply circuits A, B and C, D.

Preferably, said first pressure and/or flow regulator and/or said second pressure and/or flow regulator and/or said third pressure and/or flow regulator of the first heat transfer fluid supply circuit A, B and/or the fourth pressure regulator of the second heat transfer fluid supply circuit C, D is selected from a pressure limiter 26, 27 and/or a flow regulator 28, 29 and/or a hydraulic valve and/or an adjustable flow limiter and/or a variable throttle orifice or an additional pressure accumulator.

The second control unit preferably comprises at least one pressure sensor 22, 23, 24, 25. The pressure sensor 22, 23 can be connected to the working fluid supply circuit J, H. Alternatively, the pressure sensor 24, 25 can be connected to the first supply circuit A, B or to the second supply circuit C, D. The second control unit can also include a temperature sensor 37, 38 which can be connected to the first supply circuit A, B or to the second supply circuit C, D.

Preferably and as illustrated in FIGS. 3 and 4, said heat engine comprises at least a first module 3, 3' and a second module 3, 3', which are connected in series to each other at their thermodynamic fluid supply outlet G or their hydraulic fluid supply outlet E by means of a first interconnection line 31, which are connected in series with each other at their first supply circuit A, B, and which are connected in series with each other at their second supply circuit C, D.

Preferably, said first control unit is arranged at least to centrally control the phase in which the thermodynamic cycle is in said first module 3, 3' and in said second module 3, 3'.

Alternatively, said second control unit is common to both the first module 3, 3' and the second module 3, 3' and is arranged to centrally control said at least one displacer of the first module 3, 3' and said at least one displacer of the second module 3, 3'.

As illustrated in FIGS. 8 to 11, said heat engine comprises at least one first module 32 and at least one second module 33, which are each connected to the first conversion unit 6 via their thermodynamic fluid supply outlet G or via their hydraulic fluid supply outlet E, and the first module 32 and the second module 33 are arranged so that when said at least one displacer of the first module 32 is in the cold part 4 then said at least one displacer of the second module 33 is in the hot part 5.

Advantageously, this configuration is referred to as phase opposition. The examples shown in FIGS. 8 to 11 differ in the way they manage energy from the 2-3 isobaric heating phase. This management depends on the conversion system installed (hydraulic motor mapping, inertia size). It is therefore interesting to be able to modulate this energy to supply the hydraulic motor 12 in its most efficient zone.

In a first example shown in FIG. 8, the first conversion unit 6 and the second conversion unit 18 are substantially identical to those of the first embodiment shown in FIG. 3. The heat engine heats at least one first module 32 forming an assembly A, while cooling at least one second module 33 forming an assembly B, to avoid working with oversized hydraulic pressure accumulators 11. Hydraulic fluid thus passes from said at least one first module 32 to said at least one second module 33. In this case, the pressure accumulator 11 only acts as a buffer storage, as the thermodynamic fluid does not necessarily contract at the same rate as it expands on the opposite side. Equilibrium detection of said at least one second module 33 is achieved, for example, by means of a flowmeter 34. Four non-return valves 35 form a passive flow management system between said at least one first module 32 and said at least one second module 33.

Advantageously, in the first example shown in FIG. 8, the energy of the 2-3 isobaric heating phase is not stored and feeds the hydraulic motor 12 directly when the adjustable pressure limiter 16 is opened to the pressure of cycle point 2. There is no flow control for hydraulic motor 12.

In a second example shown in FIG. 9, the addition of an additional pressure accumulator 30 in the high-pressure section after the hydraulic valve 15 can smooth the flow of fluid supplied to motor 8 during polytropic expansion, enabling the latter to operate in its most efficient range. Pressure accumulator 11 is pre-charged to at least the critical pressure of the thermodynamic fluid.

Advantageously, in the second example of FIG. 9, the energy of the 2-3 isobaric heating phase is partially stored in an additional pressure accumulator 30 in order to smooth the flow feeding the hydraulic motor 12 during this phase.

In a third example, illustrated in FIG. 10, an additional pressure accumulator 30 is selected, sized to store all the energy during the 2-3 isobaric heating phase. In this case, it is possible to simplify matters by placing the additional pressure accumulator 30 before the hydraulic valve 15, thus dispensing with the adjustable pressure limiter 16. When the hydraulic valve 15 is opened, the energy produced by isobaric heating and, preferably, polytropic expansion is released. Inertia 19 then determines the expansion time.

Check valves 35 can be simple (FIGS. 8 and 9) or tared (FIG. 10).

Advantageously, in the third example shown in FIG. 10, the energy of the 2-3 isobaric heating phase is fully stored in an additional pressure accumulator 30 and then released at the start of the 3-4 expansion phase.

This management of energy from the 2-3 isobaric phase is a major advantage. Indeed, the energy of the thermodynamic cycle is recovered during two phases, the isobaric heating phase and the preferably polytropic expansion phase. The times of these two phases can be very different, with the expansion phase being faster than the isobaric heating phase. As a result, the flow rates supplied to motor 8 can vary considerably from one phase to the next. However, hydraulic motors 12, for example, maintain good efficiencies within defined flow rate ranges, which may be lower than the actual flow rate variations of the cycle. This is why, in the examples shown in FIGS. 9 and 10, it is proposed to "smooth" this energy, by partially or totally storing the energy of the isobaric heating phase in an additional pressure accumulator 30 placed before or after the pressure and/or flow control element 13 (hydraulic valve 15). In this way, it is possible to modulate the feed rate to motor 8 to remain within its high-efficiency range. The order of magnitude of the time required to complete a thermodynamic cycle varies greatly depending on the temperature difference between the first and second heat sources 1, 2, but ranges from a few seconds to a few tens of seconds. The thermodynamic cycle is performed without a mechanical compressor.

In a fourth example shown in FIG. 11, the configuration is similar to that of FIG. 4. A 4/2-way valve 36 can also fulfil the role of managing flows between the different assemblies A and B, but needs to be piloted (active system), unlike the four non-return valves 35 described above.

The operation of the third example shown in FIG. 10 is explained below in relation to FIGS. 12 to 17. As illustrated in FIG. 12, said at least one first module 32 of assembly A is heated in isochore heating phase 1-2 and said at least one second module 33 of assembly B is cooled in expansion phase 4-1. Coupling 20 is decoupled. Hydraulic valve 15 is closed. The additional pressure accumulator 30 is closed as long as the pressure is below the precharge pressure of the additional pressure accumulator 30. This phase is completed when the pressure in said at least one first module 32 of assembly A is equal to the precharge pressure of additional pressure accumulator 30.

As shown in FIG. 13, said at least one first module 32 of assembly A is heated in isobaric heating phase 2-3 and said at least one second module 33 of assembly B is cooled in expansion phase 4-1. Hydraulic valve 15 is closed. Additional pressure accumulator 30 is open and stores energy from isobaric heating phase 2-3. The flow meter 341 detects the end of this heating phase.

As shown in FIG. 14, said at least one first module 32 of assembly A is in expansion phase 3-4 and said at least one second module 33 of assembly B is cooled in expansion phase 4-1. Hydraulic valve 15 is open. The additional pressure accumulator 30 releases the stored energy. Rotational speed sensor 10 detects the end of the expansion phase. Flowmeter 342 detects the end of the cooling phase. The coupling 20 is coupled and the mechanical energy is converted into electricity. When expansion and cooling are complete, hydraulic valve 15 is closed and said at least one displacer of said at least one first module 32 and said at least one displacer of said at least one second module 33 are reversed by differential pressure inversion, as previously described using the second control module.

As shown in FIG. 15, said at least one first module 32 of assembly A is cooled in expansion phase 4-1 and said at least one second module 33 of assembly B is heated in isochoric heating phase 1-2. Hydraulic valve 15 is closed. Coupling 20 is decoupled. The additional pressure accumulator 30 is closed as long as the pressure is below the precharge pressure of the additional pressure accumulator 30. This phase is completed when the pressure in said at least one second module 33 of assembly B is equal to the precharge pressure of additional pressure accumulator 30.

As shown in FIG. 16, said at least one first module 32 of assembly A is cooled in expansion phase 4-1 and said at least one second module 33 of assembly B is heated in isobaric heating phase 2-3. Hydraulic valve 15 is closed. Additional pressure accumulator 30 is open and stores energy from isobaric heating phase 2-3. The flow meter 341 detects the end of this heating phase.

As shown in FIG. 17, said at least one first module 32 of assembly A is cooled in expansion phase 4-1 and said at least one second module 33 of assembly B is in expansion phase 3-4. Hydraulic valve 15 is open. Additional pressure accumulator 30 releases stored energy. The rotational speed sensor 10 and/or the pressure sensor 9, 90 associated with assembly B detect the end of the expansion phase. The flowmeter 342 and/or the pressure sensor 9, 90 associated with assembly A detect the end of this cooling phase. The coupling 20 is coupled and the mechanical energy is converted into electricity. When expansion and cooling are complete, hydraulic valve 15 is closed and said at least one displacer of said at least one first module 32 and said at least one displacer of said at least one second module 33 are reversed by differential pressure inversion, as previously described using the second control module.

Advantageously, the sequencing proposed and explained in relation to FIGS. 12 to 17 enables phase evolution to be followed in a so-called phase opposition architecture, i.e. assembly A is heated and assembly B is cooled or vice versa and two volumes of thermodynamic fluids follow opposite phases at each instant.

The displacers within the modules are reversed as described in relation to FIGS. 5 to 7.

A number of elements operate "passively", thus simplifying heat engine control as much as possible. For example, non-return valves 35 ensure that the hydraulic motor 12 is always supplied in the same direction, forming a circuit managed solely by the induced pressure differences. The coupling 20, ideally of the freewheel type, requires no special action and transmits energy to the inertia only in the direction of rotation of the hydraulic motor 12, while remaining decoupled if the hydraulic motor 12 rotates slower than the inertia 19. The additional pressure accumulator 30 is set at the opening pressure of cycle point 2, enabling isochoric heating as long as the pressure is lower than the pressure at cycle point 2.

The first control unit only requires the use of two flow meters 34, 341, 342 and/or two pressure sensors 9, 90 to determine the end of the heating and cooling phases.

One of the characteristics of phase opposition architectures as illustrated in FIG. 9 is that one set A, B can sequence the first three phases of the cycle [1-2, 2-3, 3-4] independently of the other set B, A, which is only in the cooling phase [4-1]. Displacer inversion only occurs when both sequences are completed, [1-2, 2-3, 3-4] on one side and [4-1] on the other, but it has not been determined whether cooling [4-1] is systematically longer or shorter than the succession of phases [1-2, 2-3, 3-4]. The order of magnitude of the time required for the two sequences is, however, fairly close within the targeted temperature and pressure range, which avoids machine downtime.

This optimization logic only applies to anti-phase architectures. For simple architectures such as those shown in FIG. 3, only cycle optimization is possible.

FIG. 19 shows an example of a module 3 according to the invention for moving a thermodynamic fluid alternately between a cold part 4 connected to a first heat source 1 and a hot part 5 connected to a second heat source 2 for a thermodynamic cycle heat engine.

This module 3 generally comprises at least one cartridge 101 or a plurality of cartridges 101, in the example of FIG. 19, a single cartridge 101 described below is included, and further comprises:

the first heat transfer fluid supply circuit A, B connected to first circulation means 103 of said at least one cartridge 101 via at least one first supply port 135 and at least one second supply port 136 of the first circulation means 103, a second heat transfer fluid supply circuit C, D connected to second circulation means 109 of said at least one cartridge 101 via at least one third supply port 137 and at least one fourth supply port 138 of the second circulation means 109, a junction plate 139 comprising at least means for junction 114 of the cartridge 101, a working fluid supply circuit H, J, connected to a third profile 115 of said at least one cartridge 101 by at least one fifth supply port 140 comprised in the third profile 115 and at least one sixth supply port 141 comprised in the third profile 115, arranged to pilot the displacement of the piston 126, a thermodynamic fluid supply outlet G connected to chamber 124 of said at least one cartridge 101 or a hydraulic fluid supply outlet E connected to a first filling space 121 or a second filling space 123 of said chamber 124.

Preferably, as shown in FIG. 19, the working fluid supply circuit H, J is formed by said first heat transfer fluid supply circuit A, B and said second heat transfer fluid supply circuit C, D.

Preferably and as illustrated in FIG. 19, module 3 comprises a first insulating casing 143 which includes at least one first compartment 144 into which leads said at least one first supply port 135 of first circulation means 103 and at least one second compartment 145 into which leads said at least one second supply port 136 of first circulation means 103.

Preferably additionally or alternatively and as illustrated in FIG. 19, module 3 comprises a second insulating casing 143' which comprises at least one third compartment 146 into which leads said at least one third supply port 137 of second circulation means 109 and at least one fourth compartment 147 into which leads said at least one fourth supply port 138 of second circulation means 109.

The first compartment 144 and the second compartment 145 are preferably delimited by at least a first dividing wall 148.

The third compartment 146 and the fourth compartment 147 are preferably delimited by at least one second dividing wall 149.

As illustrated in FIG. 19, a cartridge 101 for moving a thermodynamic fluid between a cold part 4 connected to a first heat source 1 and a hot part 5 connected to a second heat source 2 for a thermodynamic cycle heat engine comprises at least:

a first heat exchanger, forming a so-called cold part 4, comprising a first hollow section 102 comprising first circulation means 103 for at least one heat transfer fluid suitable and intended for connection to a first heat transfer fluid supply circuit A, B connected to a first heat source, said first section 102 comprising an inner wall and an outer wall, a second exchanger, forming a so-called hot part, comprising a second hollow section 108 comprising second circulation means 109 for at least one heat transfer fluid, suitable and intended for connection to a second heat transfer fluid supply circuit C, D connected to a second heat source, said second section 108 comprising an inner wall and an outer wall, a third hollow section 115 suitable and intended for connection to at least one supply circuit for at least one working fluid J, H, said third section 115 being disposed inside the first section 102 and the second section 108, said third section 115 comprising an inner wall and an outer wall, at least part of the inner wall of the first section 102 and a first part of the outer wall of the third section 115 being spaced apart and facing each other so as to form a first filling space 121, at least part of the inner wall of the second profile 108 and a second part of the outer wall of the third profile 115 being spaced apart and facing each other so as to form a second filling space 123, at least one chamber 124 adapted and designed to contain at least one thermodynamic fluid preferably at high pressure and in the supercritical state, said chamber 124 comprising at least the first filling space 121 and the second filling space 123 which are communicating, at least one displacer 125 disposed inside said chamber 124 and slidably mounted relative to the outer wall of said third profile 115 and movable between a first position and a second position, and configured to alternately displace said at least one thermodynamic fluid between the first filling space 121 and the second filling space 123, a piston 126 disposed inside said third profile 115 and slidably mounted relative to the inner wall of said third profile 115 and movable between the first position and the second position, the piston 126 being adapted and intended to be moved by said at least one working fluid J, H between the first position and the second position, displacer 125 and piston 126 being coupled to each other.

Preferably, the third section 115 is preferably made of non-magnetic material and the displacer 125 and piston 126 are magnetically coupled to each other through the third section 115 by magnetic connection means 127.

Advantageously, this configuration enables the displacer 125 to be controlled from outside chamber 124 via a magnetic coupling between piston 126 and displacer 125. This magnetic coupling enables axial forces to be transmitted to the displacer 125 without mechanical contact and therefore without friction. Frictional losses and wear are thus avoided. This arrangement also helps to limit losses.

By non-magnetic we mean a material which has no magnetic properties or whose magnetic permeability is low, i.e. close to 1 and generally less than 50.

Preferably and as illustrated in FIG. 19, said third profile 115, said first profile 102 and said second profile 108, displacer 125 and piston 126 are coaxial.

Of course, the invention is not limited to the embodiments described and shown in the appended drawings. Modifications remain possible, in particular with regard to the constitution of the various elements or by substitution of technical equivalents, without however departing from the field of protection of the invention.

The invention claimed is:

1. Heat engine adapted and designed to perform at least one conversion of thermal energy into mechanical energy comprising at least one thermodynamic fluid and adapted and designed to implement a thermodynamic cycle comprising at least one isochoric heating phase, an expansion phase and an isobaric cooling phase, the heat engine comprising at least:

a first heat source at a first temperature T1 configured to contain and transmit thermal energy to at least one heat transfer fluid, a second heat source at a second temperature T2 configured to contain and transmit thermal energy to at least one heat transfer fluid, the first and second temperatures T1 and T2 being different, at least one module for moving the thermodynamic fluid alternately between a cold part connected to the first heat source and a hot part connected to the second heat source, said at least one module comprising at least the cold part, said at least one module comprising a first heat transfer fluid supply circuit connected to the first heat source and to the cold part, said at least one module comprising at least the hot part, said at least one module comprising a second heat transfer fluid supply circuit connected to the second heat source and to the hot part, said at least one module comprising at least one chamber suitable and designed to contain said at least one thermodynamic fluid and which is connected to at least one thermodynamic fluid supply outlet at a first pressure P1 or to a hydraulic fluid supply outlet at a second pressure P2, at least one first conversion unit for converting a pressure difference of the thermodynamic fluid into mechanical energy comprising at least one circuit which comprises at least mechanical conversion means, said first conversion unit being connected to the thermodynamic fluid supply outlet or to the hydraulic fluid supply outlet, said heat engine is characterized in that said at least one module further comprises at least one displacer movable in said chamber alternately between the cold part and the hot part, said chamber being suitable and intended to contain said at least one high-pressure thermodynamic fluid having pressures between 50 bar and 300 bar and in the supercritical state, a first control unit at least partly disposed in the first conversion unit arranged at least to control the phase in which the thermodynamic cycle is in said at least one module, and a second control unit of said at least one module arranged to control the displacement of said at least one displacer alternately between the hot part and the cold part.

2. Heat engine according to claim 1, characterized in that said first conversion unit comprises at least one pressure accumulator connected downstream of the mechanical conversion means, which is a hydraulic motor or a turbine with thermodynamic fluid in the supercritical state, said pressure accumulator being able and intended to maintain or vary the pressure of the circuit greater than or equal to the critical pressure of the thermodynamic fluid.

3. Heat engine according to claim 2, characterized in that said first control unit comprises at least one pressure and/or flow measuring member arranged to control the phase in which the thermodynamic cycle is, and to determine the completion of each phase of the cycle, said pressure and/or flow rate measuring member being disposed between the chamber and said pressure accumulator and disposed between the thermodynamic fluid supply outlet or the hydraulic fluid supply outlet and said pressure accumulator.

4. Heat engine according to claim 3, characterized in that said first control unit comprises at least one pressure and/or flow regulation element of the circuit arranged at least to control/pilot the isobaric heating phase and/or the expansion phase of the thermodynamic cycle, said at least one pressure and/or flow regulation element being arranged between the thermodynamic fluid supply outlet or the hydraulic fluid supply outlet and said pressure accumulator.

5. Heat engine according to claim 1, further comprising a second mechanical-to-electrical energy conversion unit connected to said first conversion unit downstream of the mechanical conversion means.

6. Heat engine according to claim 5, characterized in that the second conversion unit comprises at least one inertia connected on the one hand to a coupling and on the other hand to a generator.

7. Heat engine according to claim 1, characterized in that the module comprises at least one piston contained in a cylinder connected to a working fluid supply circuit via a first end and a second end of the cylinder for controlling the displacement of the piston movable in the cylinder and in that the displacer and the piston are coupled to each other.

8. Heat engine according to claim 7, characterized in that the second control unit comprises at least one first pressure and/or flow regulating member at the first end of the cylinder and at least one second pressure and/or flow regulating member at the second end of the cylinder for maintaining or varying a pressure difference between the first end and the second end so as to displace said at least one displacer alternately between the hot part and the cold part.

9. Heat engine according to claim 7, characterized in that the working fluid supply circuit is formed by said first heat transfer fluid supply circuit and said second heat transfer fluid supply circuit.

10. Heat engine according to claim 9, characterized in that the second control unit comprises at least a first member for regulating the pressure and/or flow rate of the first heat source and a second member for regulating the pressure and/or flow rate of the second heat source, the first pressure and/or flow-rate regulator and the second pressure and/or flow-rate regulator being configured to maintain or vary a pressure difference between the first heat source and the second heat source so as to displace said at least one displacer alternately between the cold part and the hot part.

11. Heat engine according to claim 10, characterized in that the first heat source comprises at least one first hydraulic pump, which forms the first pressure and/or flow regulating member, and in that the second heat source comprises a second hydraulic pump, which forms the second pressure and/or flow regulating member.

12. Heat engine according to claim 9, characterized in that the second control unit comprises at least a third member for regulating the pressure and/or flow rate of the first supply circuit and a fourth member for regulating the pressure and/or flow rate of the second supply circuit, the third pressure and/or flow regulating member and the fourth pressure and/or flow regulating member being configured to maintain or vary a pressure difference between the first supply circuit and the second supply circuit so as to alternately displace said at least one displacer between the cold part and the hot part.

13. Heat engine according to claim 3, characterized in that said pressure and/or flow regulating element and/or said first pressure and/or flow regulating member and/or said second pressure and/or flow regulating member and/or said third pressure and/or flow regulating member of the first heat transfer fluid supply circuit and/or the fourth pressure regulator of the second heat transfer fluid supply circuit is selected from a pressure limiter and/or a flow regulator and/or a hydraulic valve and/or an adjustable flow limiter and/or a variable throttle orifice or an additional pressure accumulator.

14. Heat engine according to claim 3, characterized in that said pressure and/or flow measuring member of the circuit is chosen from at least one pressure sensor or flowmeter or rotational speed sensor or linear displacement sensor of a hydraulic piston.

15. Heat engine according to claim 1, characterized in that the at least one module of said heat engine comprises at least a first module and a second module, which are connected in series to each other at their thermodynamic fluid supply outlet or their hydraulic fluid supply outlet by means of a first interconnecting line, which are connected in series with each other at their first supply circuit, and which are connected in series with each other at their second supply circuit.

16. Heat engine according to claim 15, characterized in that said first control unit is arranged at least to centrally control the phase in which the thermodynamic cycle is in said first module and in said second module.

17. Heat engine according to claim 15, characterized in that said second control unit is common to the first module and the second module and is arranged to centrally control said at least one displacer of the first module and said at least one displacer of the second module.

18. Heat engine according to claim 1, characterized in that the at least one module of said heat engine comprises at least one first module and at least one second module, which are each connected to the first conversion unit via their thermodynamic fluid supply outlet or via their hydraulic fluid supply outlet, and in that the first module and the second module are arranged so that when said at least one displacer of the first module is in the cold part then said at least one displacer of the second module is in the hot part.

* * * * *